(12) United States Patent
Aboueldahab

(10) Patent No.: US 10,263,514 B1
(45) Date of Patent: Apr. 16, 2019

(54) SELECTABLE CONVERSION RATIO DC-DC CONVERTER

(71) Applicant: pSemi Corporation, San Diego, CA (US)

(72) Inventor: Walid Fouad Mohamed Aboueldahab, Wokingham (GB)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 15/920,327

(22) Filed: Mar. 13, 2018

(51) Int. Cl.
*H02M 3/07* (2006.01)
*H02M 3/158* (2006.01)
*H02M 1/00* (2006.01)

(52) U.S. Cl.
CPC .......... *H02M 3/07* (2013.01); *H02M 3/1582* (2013.01); *H02M 2001/0041* (2013.01); *H02M 2001/0083* (2013.01); *H02M 2003/072* (2013.01)

(58) Field of Classification Search
CPC .... H02M 2/33546; H02M 3/156; H02M 1/32; H02M 2001/072; G05F 1/462; Y02B 70/16; H05B 33/0815; H05B 33/083
USPC ...... 363/49, 56.01, 59, 60, 71; 323/207, 224, 323/271, 284; 307/109, 110
See application file for complete search history.

(56) References Cited

U.S. PATENT DOCUMENTS

| | | | | |
|---|---|---|---|---|
| 6,812,776 B2* | 11/2004 | Henry | ................ | H02M 3/07 327/535 |
| 9,473,073 B2* | 10/2016 | Liu | ................ | H02M 3/07 |
| 9,634,560 B2* | 4/2017 | Ek | ................ | H02M 3/07 |
| 2009/0072800 A1* | 3/2009 | Ramadass | ................ | H02M 3/07 323/271 |
| 2013/0234785 A1* | 9/2013 | Dai | ................ | H02M 3/07 327/536 |

(Continued)

OTHER PUBLICATIONS

Ng, et al., "Switched Capacitor DC-DC Converter: Superior where the Buck Converter has Dominated", Electrical Engineering and Computer Sciences, University of California at Berkeley, Technical Report No. UCB/EECS-2011-94, http://www.eecs.berkeley.edu/Pubs/TechRpts/2011/EECS-2011-94.html, Aug. 17, 2011, pp. 8-11 (141 pgs).

(Continued)

*Primary Examiner* — Rajnikant B Patel
(74) *Attorney, Agent, or Firm* — Jaquez Land Greenhaus LLP; Martin J. Jaquez, Esq.; John Land, Esq.

(57) ABSTRACT

A single integrated circuit DC-to-DC conversion solution that can be used in conjunction with product designs requiring at least two different DC-to-DC conversion ratios, and in particular both divide-by-2 and divide-by-3 DC-to-DC buck conversion ratios or both multiply-by-2 and multiply-by-3 DC-to-DC boost conversion ratios. Embodiments are reconfigurable between a first Dickson converter configuration that includes at least two non-parallel capacitors (any of which may be off-chip) and associated controlled multi-phase switching to achieve a first conversion ratio, and a second Dickson converter configuration that includes a lesser equivalent number of capacitors than the first circuit configuration (which may be accomplished by parallelizing at least two non-parallel capacitors of the first configuration) and associated controlled multi-phase switching to achieve a second conversion ratio different from the first conversion ratio.

9 Claims, 11 Drawing Sheets

(56) References Cited

U.S. PATENT DOCUMENTS

2016/0116925 A1* 4/2016 Freeman .......... H02M 3/33546
    307/130
2016/0234895 A1* 8/2016 Delos Ayllon ..... H05B 33/0815

OTHER PUBLICATIONS

Paul, et al., "High Voltage Switching Device" U.S. Patent Application filed in the USPTO on Dec. 5, 2017, U.S. Appl. No. 15/832,626, 42 pgs.

* cited by examiner

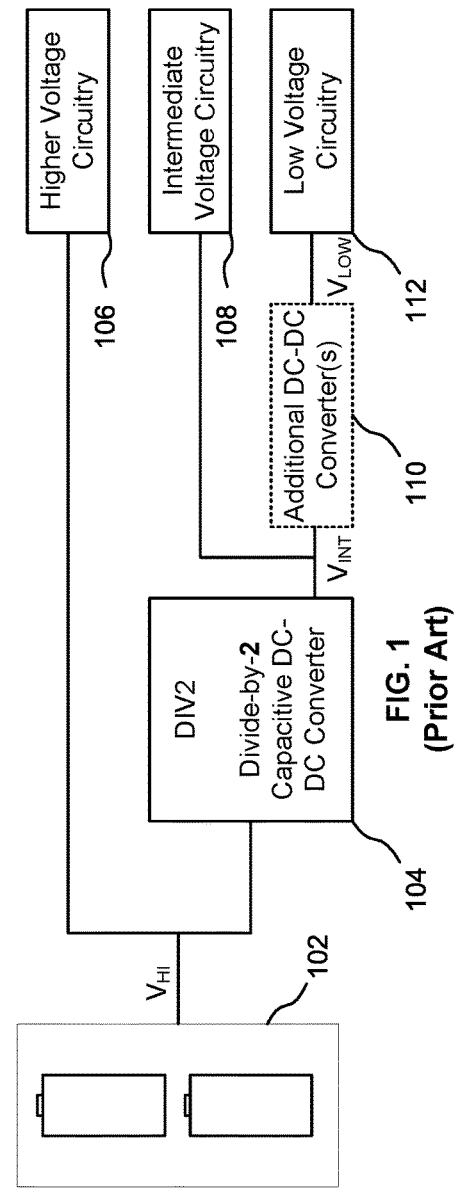
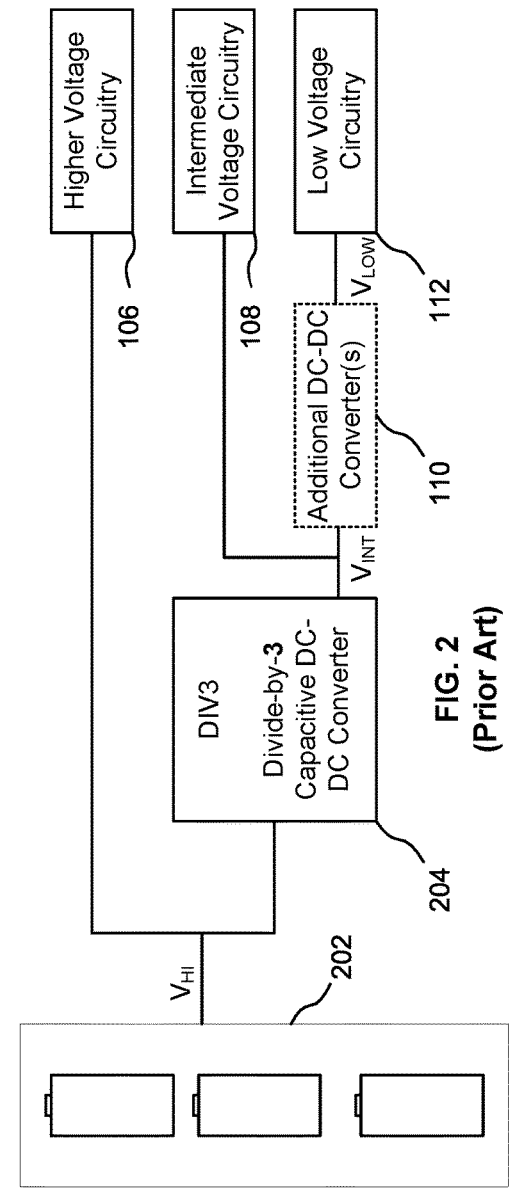

Divide-by-2 DC-DC Converter
(Prior Art)

Divide-by-3 DC-DC Converter
(Prior Art)**

DIV3 Configuration

DIV2 Configuration

SELECTABLE CONVERSION RATIO DC-DC CONVERTER

BACKGROUND

(1) Technical Field

This invention relates to electronic circuits, and more particularly to DC-to-DC converter circuits.

(2) Background

Many electronic products, particularly mobile computing and/or communication products (e.g., notebook computers, ultra-book computers, and tablet devices) use lithium ion (Li-Ion) batteries as a power source. Li-Ion batteries typically come in the form of either two or three series-connected cells (including parallel sets of such series-connected cells) having a nominal open-circuit voltage of about 3-5V per cell, depending primarily on battery chemistry. Commonly available 2-cell Li-Ion batteries may provide an output voltage range of about 6-10V DC, while commonly available 3-cell Li-Ion batteries may provide an output voltage range of about 9V DC to about 15-16V DC.

Many battery-operated electronic systems require multiple voltage levels. For example, radio transmitter power amplifiers may require relatively high voltages (e.g., 12V or more), whereas logic circuitry may require a fairly low voltage level (e.g., 1-2V). Still other circuitry may require an intermediate voltage level (e.g., 5-10V).

It is common to use DC-to-DC converters to generate a lower or higher DC voltage from a DC power source. DC-to-DC converters which generate intermediate and/or low voltage levels from a higher voltage DC power source are commonly known as buck converters, so-called because $V_{OUT}$ is less than $V_{IN}$, and hence the converter is "bucking" the input voltage. DC-to-DC converters which generate higher voltage levels than a DC power source are commonly known as boost converters, because $V_{OUT}$ is greater than $V_{IN}$. Many options exist to create buck and boost converters, including inductive, capacitive, and linear regulator (including Low Drop Out—LDO—regulators) circuits, with size and efficiency being an important differentiator among them. For typical buck DC-to-DC converters dropping large percentages of the input voltage (from 15V to 1.8V, for example) in a single down-conversion step is typically inefficient. In the case of inductive buck converters, a large conversion ratio would require quite large inductors, which is often unacceptable for many applications, particularly for mobile applications. For linear converters, such a large conversion ratio would be unacceptably inefficient.

While the most efficient DC-to-DC converters often require inductors, smaller converters can be achieved based on switched capacitor (SC) designs. Switched capacitor DC-to-DC converters require no inductors and are therefore well-suited for mobile battery-powered applications. Switched capacitor DC-to-DC converters are generally integrated circuits (ICs) that may have some external components (such as capacitors) and in some cases are characterized by having fixed integer-based conversion ratios (e.g., division by 2 or 3), as opposed to fractional conversion ratios. Step-down buck SC DC-to-DC converters generally work on the principle of charging capacitors in series and then switching the capacitors into other configurations (e.g., parallel) to create a desired output voltage based on charge sharing between the different configurations. A specific type of SC DC-to-DC converter is a Dickson converter, which is compact and well-suited for mobile applications that require an initial integer-based down-conversion, such as division by 2 or 3. Prior Dickson converters were able to offer only a single integer divide ratio, thereby limiting flexibility and increasing inventory requirements for manufacturers. A general discussion of the operation of a Dickson converter may be found, for example, in Technical Report No. UCB/EECS-2011-94, Aug. 17, 2011, entitled "*Switched Capacitor DC-DC Converter: Superior where the Buck Converter has Dominated*", by Vincent Wai-Shan Ng and Seth R. Sanders, Electrical Engineering and Computer Sciences, University of California at Berkeley (see, e.g., pp. 8-11 in particular).

FIG. 1 is a block diagram 100 of a prior art 2-cell battery 102 and electronic system that includes a switched capacitor divide-by-2 DC-to-DC converter 102. The 2-cell battery 102 provides a DC output voltage $V_{HI}$ that may be applied to higher voltage circuitry 106; such circuitry may include suitable voltage regulators to provide a uniform internal voltage. For a 2-cell battery 102 using Li-Ion technology, $V_{HI}$ is typically about 6-10V. The divide-by-2 SC DC-to-DC converter 104 down-converts $V_{HI}$ to an intermediate voltage $V_{INT}$ that may be applied to intermediate voltage circuitry 108. For a 2-cell battery 102 using Li-Ion technology, $V_{INT}$ is typically about 3-5V.

The output of the divide-by-2 SC DC-to-DC converter 104 optionally may be further down-converted by one or more secondary DC-to-DC converters 110 to an even lower output voltage, $V_{LOW}$, such as 1-1.8V. When the step-down ratio from $V_{INT}$ to $V_{LOW}$ is relatively low, the secondary DC-to-DC converters 110 may be nearly any type of inductive, capacitive, or linear buck DC-to-DC converter. For example, $V_{LOW}$ may be generated by a voltage regulator circuit such as an analog LDO regulator; an LDO regulator can output any voltage, but is often inefficient.

FIG. 2 is a block diagram 200 of a prior art 3-cell battery 202 and electronic system that includes a switched capacitor divide-by-3 DC-to-DC converter 204. While very similar to FIG. 1, because of the higher voltage of the 3-cell battery 202 (typically about 9 to about 15-16V for Li-Ion technology), a divide-by-3 DC-to-DC converter 204 must be used to obtain the same level of $V_{INT}$ (i.e., about 3-5V) as in the 2-cell battery 102 system of FIG. 1.

With all DC-to-DC converters, efficiency is key to extending battery life and reducing cost and weight in a system; in particular, low cost is critical for many electronic components and systems. Further, manufacturers of electronic products generally desire flexible components that can be applied to more than one design, such as a battery management system that can handle battery systems with 2 cells or with 3 cells, without substantially sacrificing efficiency or increasing cost. However, as FIG. 1 and FIG. 2 demonstrate, the number of battery cells in a system imposes a constraint on a manufacturer to use either a divide-by-2 SC DC-to-DC converter IC or a divide-by-3 SC DC-to-DC converter IC, due to the discrete integer-based division ratio of such converters. Accordingly, a manufacturer must source, inventory, and manage deployment of two separate SC DC-to-DC converter parts in order to accommodate both 2-cell and 3-cell battery sizes for various products, all of which increases manufacturing costs.

Accordingly, there is a need for a single-chip solution that can be used in conjunction with product designs requiring at least two different DC-to-DC buck conversion ratios. It would be useful if such a product could also allow at least two different DC-to-DC boost conversion ratios. Such a single-chip solution would enable lower costs, and easier part sourcing and management. The present invention addresses these and other needs.

SUMMARY

The present invention encompasses a single-chip solution that can be used in conjunction with product designs requiring at least two different DC-to-DC conversion ratios, and in particular both divide-by-2 and divide-by-3 DC-to-DC buck conversion ratios or both multiply-by-2 and multiply-by-3 DC-to-DC boost conversion ratios. Single-chip solutions encompassed by the present invention lowers costs, and enables easier part sourcing and management.

Preferred embodiments of the current invention encompass a novel switched capacitor DC/DC converter that can provide selectable integer divide ratios (specifically, buck conversion ratios of 2 or 3) while maintaining high efficiency.

A number of different circuits are disclosed that provide at least two different DC-to-DC conversion ratios. Embodiments are reconfigurable between a first configuration that includes at least two non-parallel capacitors (any of which may be off-chip) and associated controlled multi-phase switching to achieve a first conversion ratio, and a second configuration that includes a lesser equivalent number of capacitors than the first circuit configuration (which may be accomplished by parallelizing at least two non-parallel capacitors of the first configuration) and associated controlled multi-phase switching to achieve a second conversion ratio different from the first conversion ratio.

More specifically, preferred embodiments of the current invention encompass a novel switched capacitor DC/DC converter that can provide selectable integer divide ratios (specifically, buck conversion ratios of 2 or 3) while maintaining high efficiency. One embodiment of the novel DC-to-DC conversion integrated circuit includes: a first circuit configuration operable as a Dickson converter circuit for converting an applied input voltage to a first output voltage having a first conversion ratio with respect to the applied input voltage; a second circuit configuration operable as a Dickson converter circuit for converting the applied input voltage to a second output voltage having a second conversion ratio with respect to the applied input voltage; a configuration element for selectively configuring the DC-to-DC conversion circuit to one of the first circuit configuration or the second circuit configuration; and a configurable clock signal control circuit, coupled to the first circuit configuration and the second first circuit configuration, that selectively outputs a first set of clock signals for operating the first circuit configuration and a second set of clock signals for operating the second circuit configuration.

In some embodiments, in a first configuration, a selectable clock signal control circuit outputs a first clock signal phase to at least one switch of a switch array, a first capacitor is not connected in parallel with a second capacitor, and the switch array is operated, in response to respective application of the first clock signal phase and a second clock signal phase, to cyclically charge and discharge the first capacitor and the second capacitor so as to provide an output voltage at the output voltage terminal that has a first ratio with respect to the input voltage. In a second configuration, the selectable clock signal control circuit outputs the second clock signal phase to at least one switch of the switch array, the first capacitor is connected in parallel with the second capacitor and the switch array is operated, in response to respective application of the first clock signal phase and the second clock signal phase, to cyclically charge and discharge the first capacitor and the second capacitor in parallel (i.e., essentially as a single, larger capacitor) so as to provide an output voltage at the output voltage terminal that has a second ratio with respect to the input voltage, the second ratio being different from the first ratio.

In other embodiments, in a first configuration in which a first capacitor and a second capacitor have been coupled to a switch array and the first capacitor is not connected in parallel with the second capacitor, the switch array is operated, in response to respective application of a first clock signal phase and a second clock signal phase, to cyclically charge and discharge the first capacitor and the second capacitor so as to provide an output voltage at the output voltage terminal that has a first ratio with respect to the input voltage. In a second configuration, only one of the first capacitor and the second capacitor is coupled to the switch array, and the switch array is operated, in response to respective application of the first clock signal phase or the second clock signal phase or a first logic state or a second logic state, to cyclically charge and discharge the one capacitor coupled to the switch array so as to provide an output voltage at the output voltage terminal that has a second ratio with respect to the input voltage, the second ratio being different from the first ratio.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1 is a block diagram of a prior art 2-cell battery and electronic system that includes a switched capacitor divide-by-2 DC-to-DC converter.

FIG. 2 is a block diagram of a prior art 3-cell battery and electronic system that includes a switched capacitor divide-by-3 DC-to-DC converter.

Like reference numbers and designations in the various drawings indicate like elements.

DETAILED DESCRIPTION

The present invention encompasses a single-chip solution that can be used in conjunction with product designs requiring at least two different DC-to-DC conversion ratios, and in particular both divide-by-2 and divide-by-3 DC-to-DC buck conversion ratios or both multiply-by-2 and multiply-by-3 DC-to-DC boost conversion ratios. Single-chip solutions encompassed by the present invention lowers costs, and enables easier part sourcing and management.

Preferred embodiments of the current invention encompass a novel switched capacitor DC/DC converter that can provide selectable integer divide ratios (specifically, buck conversion ratios of 2 or 3) while maintaining high efficiency. One embodiment of the novel DC-to-DC conversion integrated circuit includes: a first circuit configuration operable as a Dickson converter circuit for converting an applied input voltage to a first output voltage having a first conversion ratio with respect to the applied input voltage; a second circuit configuration operable as a Dickson converter circuit for converting the applied input voltage to a second output voltage having a second conversion ratio with respect to the applied input voltage; a configuration element for selectively configuring the DC-to-DC conversion circuit to one of the first circuit configuration or the second circuit configuration; and a configurable clock signal control circuit, coupled to the first circuit configuration and the second first circuit configuration, that selectively outputs a first set of clock signals for operating the first circuit configuration and a second set of clock signals for operating the second circuit configuration.

Since the architecture used for embodiments of the present invention is a switched capacitor (SC) design based on a novel hybrid variant of the Dickson converter topology, a better understanding of conventional Dickson converter topologies will aid in understanding how to make and use embodiments of the present invention.

Divide-by-2 Dickson Converter Topology

Figure 3A:
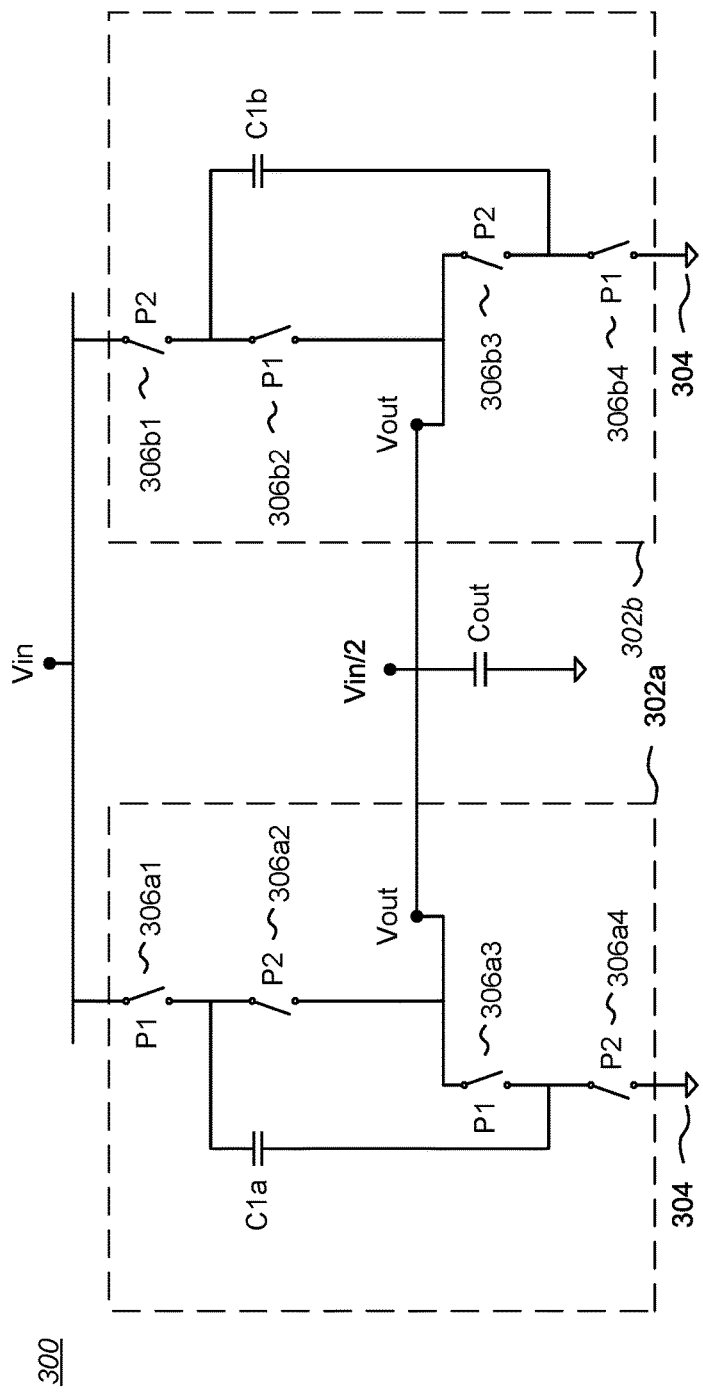
FIG. 3A is a schematic diagram of a prior art divide-by-2 Dickson converter.

FIG. 3A is a schematic diagram of a prior art divide-by-2 Dickson converter 300. The illustrated converter 300 includes two parallel cells 302a, 302b that are coupled between a voltage source $V_{IN}$ and a reference potential 304 such as circuit ground. Each cell 302a, 302b includes 4 series-connected switches 306a1-306a4, 306b1-306b4. Each switch may be, for example, one or more field effect transistors (FETs), such as one or more MOSFETs.

Figure 3B:
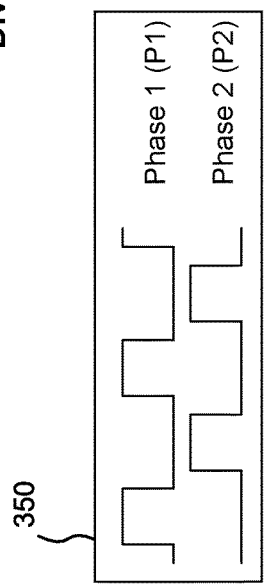
FIG. 3B is a timing diagram of a multi-phase clock signal having two phases for use in conjunction with the circuit shown in FIG. 3A.

Each switch 306a1-306a4, 306b1-306b4 is coupled to one of two clock phases, P1 or P2. FIG. 3B is a timing diagram 350 of a multi-phase clock signal having two phases for use in conjunction with the circuit shown in FIG. 3A; in general, the pulses of phases P1 and P2 should not overlap.

Focusing on the left cell 302a illustrated in FIG. 3A, coupled between an upper pair of alternating phase (P1, P2) switches 306a1, 306a2 and a lower pair of alternating phase (P1, P2) switches 306a3, 306a4 is a capacitor C1a. In operation, when the P1 switches are closed, capacitor C1a is charged in series with an output capacitor $C_{OUT}$ coupled to an output node $V_{OUT}$. Capacitor C1a charges up to an intermediate voltage $V_{INT}=V_{IN}-V_{OUT}$, and remains at $V_{INT}$ until the P1 switches are opened and the P2 switches are closed. When that event occurs, capacitor C1a is placed in parallel with the output capacitor $C_{OUT}$ coupled to $V_{OUT}$; accordingly, the charge on capacitor C1a is provided to the output node $V_{OUT}$, thereby enabling $C_{OUT}$ to charge up. This process repeats with each full clock cycle. Applying Kirckhoff's Current Law (KCL) to the nodes of the arrangement shows that in steady state, $V_{OUT}$ will be maintained at $V_{IN}/2$—that is, the voltage at $V_{OUT}$ is down-converted to be one-half of the input voltage $V_{IN}$, a conversion ratio of 2:1.

The layout of the right cell 302b illustrated in FIG. 3A is essentially identical to the left cell 302a, except that the polarity of the switches 306b1-306b4 of the right cell 302b are 180° out of phase with respect to the switches 306a1-306a4 of the left cell 302a. Thus, for example, the clock signal applied to switch 306b1 in cell 302b is P2, whereas the clock signal applied to switch 306a1 in cell 302a is P1.

Divide-by-3 Dickson Converter Topology

Figure 4:
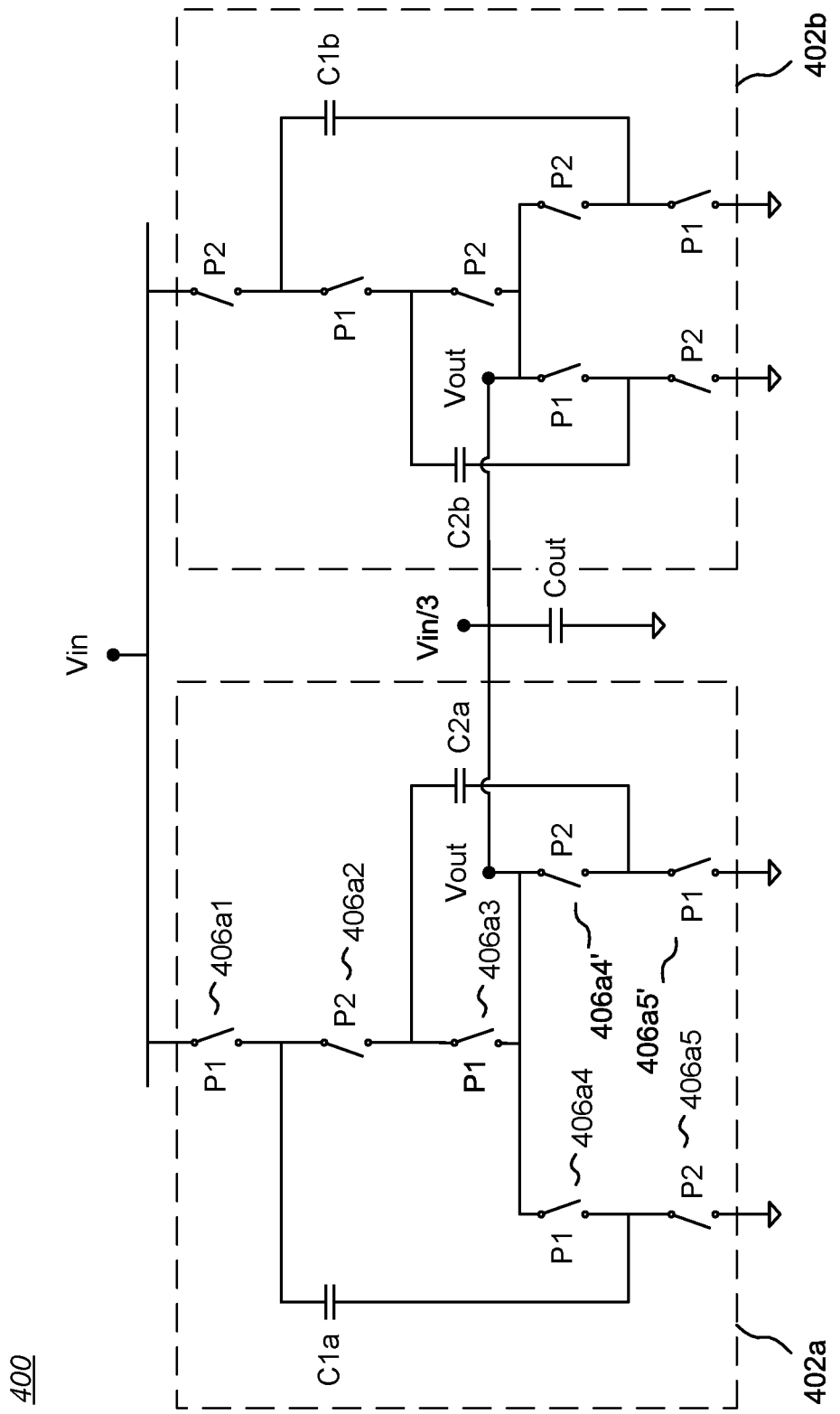
FIG. 4 is a schematic diagram of a prior art divide-by-3 Dickson converter.

FIG. 4 is a schematic diagram of a prior art divide-by-3 Dickson converter 400. The illustrated converter 400 operates on the same principles as the converter 300 of FIG. 3A, but with three additional switches and one additional capacitor per complementary cell 402a, 402b. More specifically, focusing on the left cell 402a illustrated in FIG. 4, the cell 402a includes 3 series-connected switches 406a1-406a3 coupled in series to a first branch comprising 2 series-connected switches 406a4 and 406a5, and to a second branch comprising 2 series-connected switches 406a4' and 406a5'. Each switch may comprise, for example, one or more FETs, including one or more MOSFETs. Each switch is coupled to one of two complementary clock phases, P1 or P2.

Coupled between a first upper pair of alternating phase (P1, P2) switches 406a1, 406a2 and a first branch pair of alternating phase (P1, P2) switches 406a4, 406a5 is a first capacitor C1a. Coupled between a second upper pair of alternating phase (P2, P1) switches 406a2, 406a3 and a second branch pair of alternating phase (P2, P1) switches 406a4', 406a5' is a second capacitor C2a.

In this example, with 3 capacitors (e.g., C1a, C2a, and $C_{OUT}$), the converter 400 divides $V_{IN}$ to an output voltage $V_{OUT}=V_{IN}/3$. The operation is similar to the converter 300 of FIG. 3A, except that the additional capacitor C2a is charged in series with capacitor C1a, thereby increasing the divide ratio and decreasing the output voltage to $V_{IN}/3$, for a conversion ratio of 3:1.

The layout of the right cell 402b illustrated in FIG. 4 is essentially identical to the left cell 402a, except that the polarity of the switches of the right cell 402b are 180° out of phase with respect to the switches of the left cell 402a (reference labels have been omitted from the right cell 402b to avoid clutter).

Selectable Conversion Ratio DC-DC Converter

As should be clear, the fixed divide-by-2 Dickson converter 300 of FIG. 3A is substantially different from the fixed divide-by-3 Dickson converter 400 of FIG. 4, and the two are not interchangeable. It is a goal of the current invention to disclose a single circuit that can be operated in such a manner as to provide at least two different DC-to-DC conversion ratios, in particular integer-based conversion ratios, and more particularly both divide-by-2 and divide-by-3 DC-to-DC buck conversion ratios or both multiply-by-2 and multiply-by-3 DC-to-DC boost conversion ratios.

A number of different circuits are disclosed that provide at least two different DC-to-DC conversion ratios. In the most general terms, embodiments are reconfigurable between a first configuration that includes at least two non-parallel capacitors (any of which may be off-chip) and associated controlled multi-phase switches operated to achieve a first conversion ratio, and a second configuration that includes a lesser equivalent number of capacitors than the first circuit configuration (which may be accomplished by parallelizing at least two non-parallel capacitors of the first configuration) and associated controlled multi-phase switches operated to achieve a second conversion ratio different from the first conversion ratio.

First Embodiment

Figure 5:
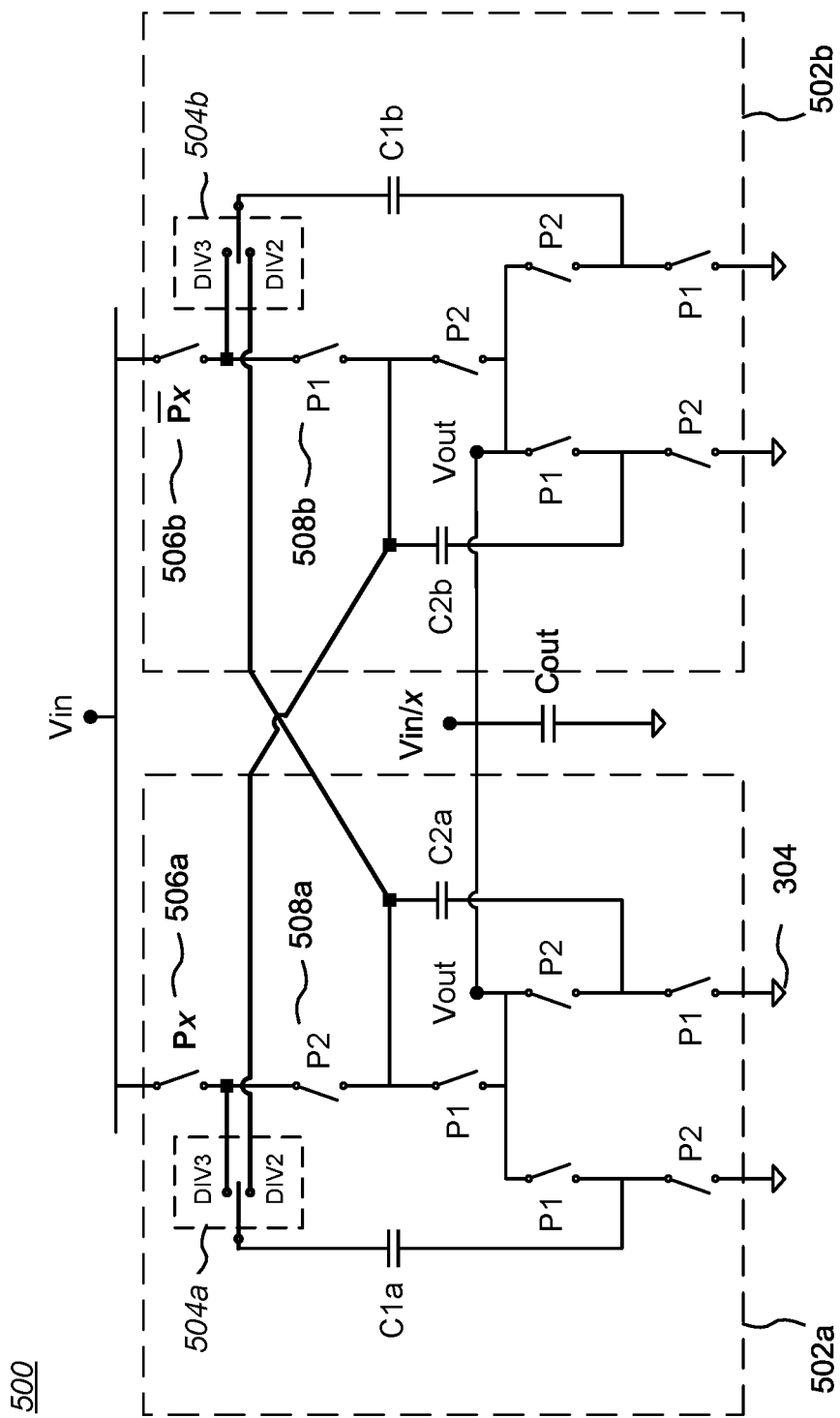
FIG. 5 is a schematic diagram of a first embodiment of a selectable conversion ratio DC-DC converter.

FIG. 5 is a schematic diagram of a first embodiment of a selectable conversion ratio DC-DC converter 500. In particular, the specific illustrated converter 500 may be selectably configured to be either a divide-by-2 Dickson converter or a divide-by-3 Dickson converter using the same basic circuit. The same converter 500 may be used for DC-to-DC boost conversion by reversing the voltage input and voltage output.

As shown, the layout of the array of switches controlled by clock signals P1 and P2 and of capacitors C1a, C2a, C1b, C1b is essentially the same as for the divide-by-3 Dickson converter 400 of FIG. 4, except that each cell 502a, 502b includes a respective added configuration element 504a, 504b and alternative "DIV3" conductors and "DIV2" conductors (the reference numbers from FIG. 4 have been omitted to avoid clutter). In addition, in cell 502a, the switch 506a directly coupled to $V_{IN}$ is controlled by a selectable clock signal, Px, while in complementary cell 502b, the switch 506b directly coupled to $V_{IN}$ is controlled by the complement of the selectable clock signal, $\overline{Px}$.

When the configuration elements 504a, 504b are configured so as to couple a respective capacitor C1a, C1b to a corresponding DIV3 conductor, AND the phase of the clock signal Px is set to be the same as P1 in cell 502a and the phase of the complementary clock signal $\overline{Px}$ is set to be the same as P2 in cell 502b, then the converter 500 operates as a divide-by-3 Dickson converter circuit in exactly the same manner as the conventional converter 400 of FIG. 4; thus, $V_{OUT}=V_{IN}/3$.

When the configuration elements 504a, 504b are configured so as to couple a respective capacitor C1a, C1b to a corresponding DIV2 conductor, those capacitors C1x are connected in parallel with the C2x capacitors of another cell. Thus, in the illustrated example, capacitor C1a in cell 502a is coupled in parallel with capacitor C2b in cell 502b, while capacitor C1b in cell 502b is coupled in parallel with capacitor C2a in cell 502a. Further, in the DIV2 configuration, the phase of the clock signal Px is set to be the same as P2 in cell 502a (rather than P1, as in the DIV3 configuration), and the phase of the complementary clock signal $\overline{Px}$ is set to be the same as P1 in cell 502b (rather than P2, as in the DIV3 configuration). As so configured, the parallel arrangement of two capacitors (e.g., C1a and C2b, or C1b and C2a) effectively forms a single equivalent capacitor and thereby eliminates having a second independent capacitor in each cell 502a, 502b of the converter 500. Accordingly, the converter 500 operates as a divide-by-2 Dickson converter circuit in exactly the same manner as the conventional converter 300 of FIG. 3A, and thus, $V_{OUT}=V_{IN}/2$. Of note, the divide-by-2 configuration of the illustrated embodiments has added current capacity compared to the conventional converter 300 of FIG. 3A, due to the parallel coupling of capacitors C1a and C2b and of capacitors C1b and C2a.

Figure 6:
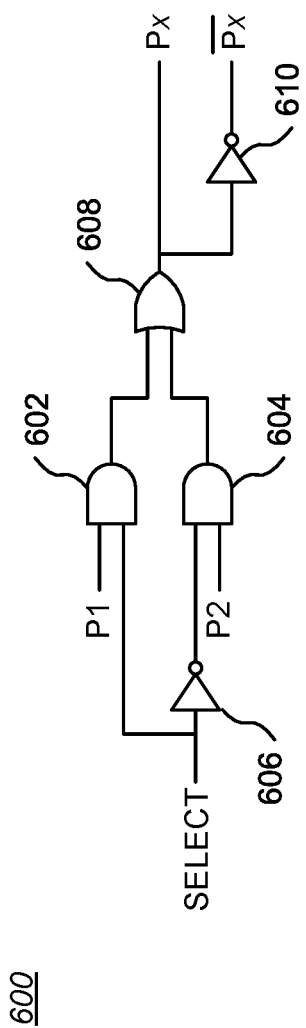
FIG. 6 is a schematic diagram of one variable phase clock generation circuit for generating a selectable clock signal Px.

FIG. 6 is a schematic diagram of one variable phase clock generation circuit 600 for generating a selectable clock signal Px. Complementary signals P1 and P2 (e.g., similar to the signals shown in FIG. 3B) are coupled as inputs to respective parallel AND gates 602, 604. A SELECT signal is coupled to another input of AND gate 602, and to another input of AND gate 604 after passing through an inverter 606. The outputs of AND gates 602, 604 are coupled to an OR gate 608, the output of which is Px; another inverter 610 generates the complement, $\overline{Px}$. When SELECT is a logic 1, then Px tracks the state of P1 (i.e., Px=0 when P1=0, and Px=1 when P1=1). Conversely, when SELECT is a logic 0, then Px tracks the state of P2 (i.e., Px=0 when P2=0, and Px=1 when P2=1). As should be clear, the circuit of FIG. 6 is essentially a simple multiplexer, and many other ways exist for "swapping" the P1 and P2 clock signals for switches 506a, 506b as needed for the DIV2 and DIV3 configurations of the converter 500.

For a specific conversion configuration, the SELECT signal may be statically set for a particular embodiment (e.g., permanently connected to a voltage or to circuit ground, not shown), or selectively set (e.g., with a mechanical or electronic switch, not shown), or dynamically set under program control (circuitry not shown). Note that dynamically setting the SELECT signal requires that the circuit connections of the capacitors (e.g., C1a, C1b) also be dynamically configurable to the DIV2 or DIV3 configurations.

Referring again to FIG. 5, in the DIV2 configuration, the switches 506a, 506b coupled to $V_{IN}$ operate on the opposite cycle from the DIV3 configuration. Thus, for example, in the DIV3 configuration, Px tracks P1 for switch 506a and $\overline{Px}$ tracks P2 for switch 506b. Conversely, in the DIV2 configuration, Px tracks P2 for switch 506a and $\overline{Px}$ tracks P1 for switch 506b. Selectively changing the phase of the switches 506a, 506b for the DIV2 configuration essentially eliminates an independent directly-connected series switch in their respective sets of switches, since there are now two P1 or two P2 switches in series operating on the same clock phase. Thus, for example, focusing on cell 502a in FIG. 5, when Px tracks P2 for switch 506a, then switches 506a and 508a switch at the same time, and thus effectively operate as a single switch. Similarly, when $\overline{Px}$ tracks P1 for switch 506b, then switches 506b and 508b switch at the same time, and thus again effectively operate as a single switch.

The configuration elements 504a, 504b may be implemented as wired connections (e.g., jumpers or printed circuit board conductive traces—essentially zero ohm resistors—placed between a pair of externally accessible connection terminals of an integrated circuit) such that the converter 500 may be set to a particular DC-to-DC conversion ratio at the time of system manufacture (e.g., when an IC embodying the converter 500 is affixed to a printed circuit board or the like). As one alternative, the configuration elements 504a, 504b may be implemented as a mechanical single-pole, double-throw (SPDT) switch (including a microelectromechanical system [MEMS] switch) so that the configuration of the converter 500 may be manually selected. As another alternative, the configuration elements 504a, 504b may be implemented as an SPDT realized using transistor switching devices, such as field effect transistors (FETs). While this latter case would allow for dynamic or programmatic switching between conversion ratio configurations, the added series impedance attributable to such switching devices may adversely impact efficiency.

As should be recognized, by enabling two different configurations for coupling capacitors C1a and C2a, and by providing a selectable clock signal Px and its complement $\overline{Px}$, a single circuit can provide two different conversion ratios. Other combinations of divide ratios may be used, such as divide-by-3 and divide-by-4, and the concept can be extended to a single circuit that can provide more than two different conversion ratios.

The complementary phasing of the pairs of cells 502a, 502b provides output ripple smoothing and additional current capacity. As should be clear, additional cells may be included to provide even more current capacity. Complimentary pairs of additional cells may be controlled by clock signal phases that are 180° apart and that have a different phase than P1 or P2 to provide even more output ripple smoothing (e.g., 45° or 60°—or multiples of those values—out of phase with respect to P1 and P2). Thus, the two-phase clock of FIG. 3B is just one instance of a multi-phase clock.

While the switches 506a, 506b directly coupled to $V_{IN}$ are shown as controlled by the selectable clock signals, Px and $\overline{Px}$, in variant embodiments, other switches in each cell 502a, 502b can instead be controlled by the selectable clock signals, Px and Px to accomplish the same functionality.

While FIG. 5 shows an embodiment in which connections to capacitors C1a and C1b may be re-configured, the invention encompasses embodiments in which connections to capacitors C2a and C2b may be re-configured instead, with suitable changes as to which clock signal phases are applied to particular switches.

In an alternative embodiment, capacitors C1a and C1b are not cross-connected to capacitors C2b and C2a, respectively, for the DIV2 configuration. Instead, capacitors C1a and C1b are simply left disconnected—that is, the configuration elements 504a, 504b behave as a single-pole, single throw (SPST) connection, either connecting capacitors C1a and C1b in the DIV3 configuration or disconnecting capacitors C1a and C1b. In this alternative embodiment, the selectable clock signals, Px and Px, would still need to be set to a corresponding configuration, either DIV3 (when capacitors C1a and C1b are in-circuit) or DIV2 (when capacitors C1a and C1b are out-of-circuit). However, this alternative embodiment would be less efficient since no use is being made of capacitors C1a and C1b, if present, when in the DIV2 configuration.

Second Embodiment

Figure 7:
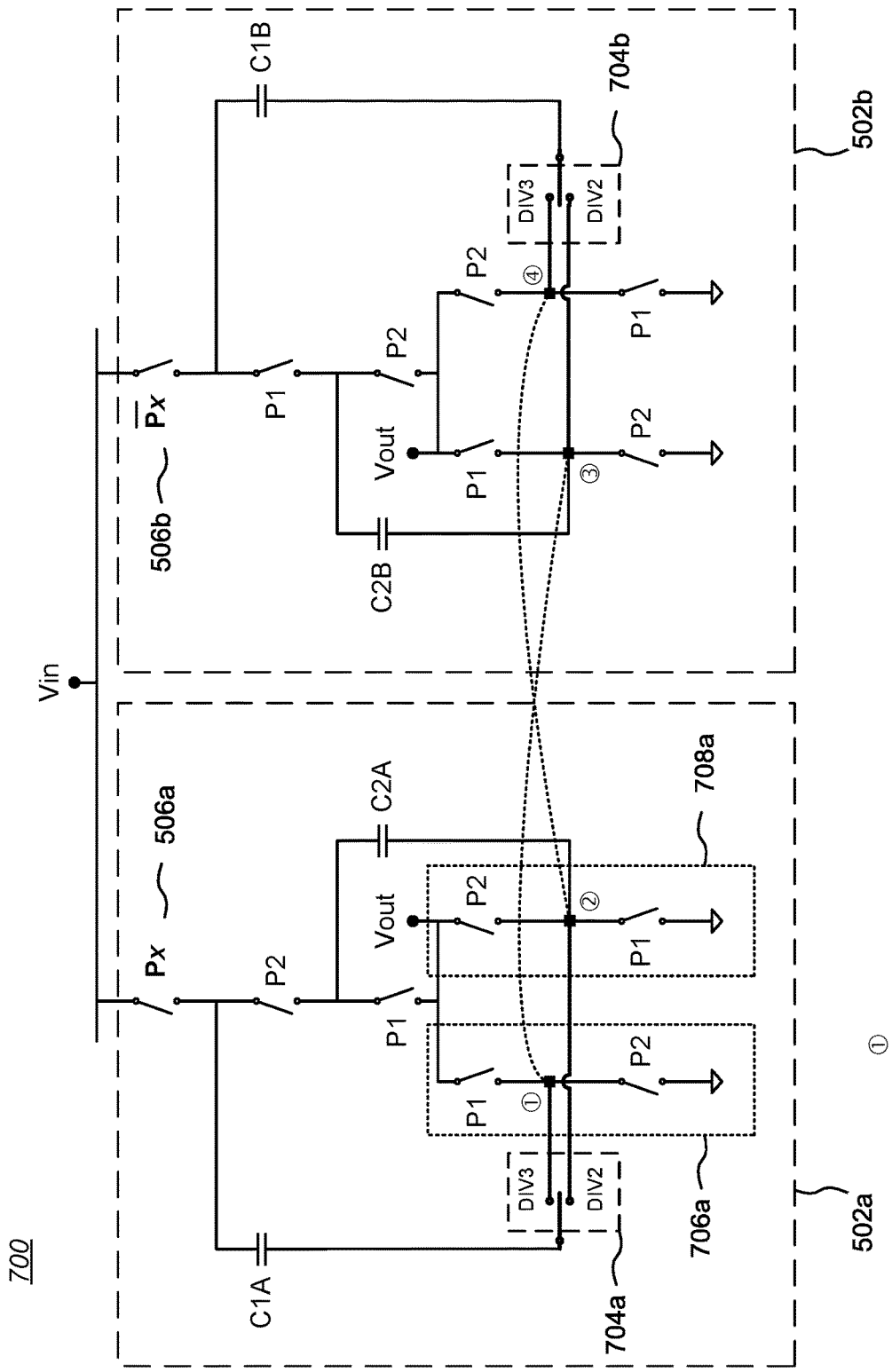
FIG. 7 is a schematic diagram of a second embodiment of a selectable conversion ratio DC-DC converter.

FIG. 7 is a schematic diagram of a second embodiment of a selectable conversion ratio DC-DC converter 700. In particular, the specific illustrated converter 700 may be selectably configured to have either a divide-by-2 or a divide-by-3 DC-to-DC buck conversion ratio using the same circuit. The same converter 700 may be used for DC-to-DC boost conversion by reversing the voltage input and voltage output.

As shown, the layout of switches controlled by clock signals P1 and P2 and of capacitors C1a, C2a, C1b, C1b is essentially the same as for the converter 500 of FIG. 5, except that each cell 502a, 502b includes a respective added configuration element 704a, 704b (rather than the configuration elements 504a, 504b shown in FIG. 5), and alternative "DIV3" conductors and "DIV2" conductors. Focusing on cell 502a, capacitor C1a may be selectively coupled either to a first branch 706a (for a divide-by-3 configuration) or to a second branch 708a (for a divide-by-2 configuration) by means of the configuration element 704a. In addition, the switch 506a directly coupled to $V_{IN}$ is controlled by the selectable clock signal, Px, while in cell 502b, the switch 506b directly coupled to $V_{IN}$ is controlled by the complementary selectable clock signal, $\overline{Px}$. Complementary cell 502b is similarly configured, but for the opposite clock phase.

In this alternative embodiment, in the DIV2 configuration, capacitor C1a is coupled in parallel with capacitor C2a within its own cell 502a, and there is no cross-connection between cells 502a, 502b, as is the case with the embodiment of FIG. 5. However, in a variant of this embodiment, for better current distribution when in the DIV2 configuration, node $\hat{1}$ and node $\hat{3}$ should be interconnected, and node $\hat{2}$ and node $\hat{4}$ should be interconnected, as shown by the dotted curved lines.

While FIG. 7 shows an embodiment in which connections to capacitors C1a and C1b may be re-configured, the invention encompasses embodiments in which connections to capacitors C2a and C2b may be re-configured instead, with suitable changes as to which control signal phases are applied to particular switches.

Third Embodiment

Figures 8A, 8B, 8C:
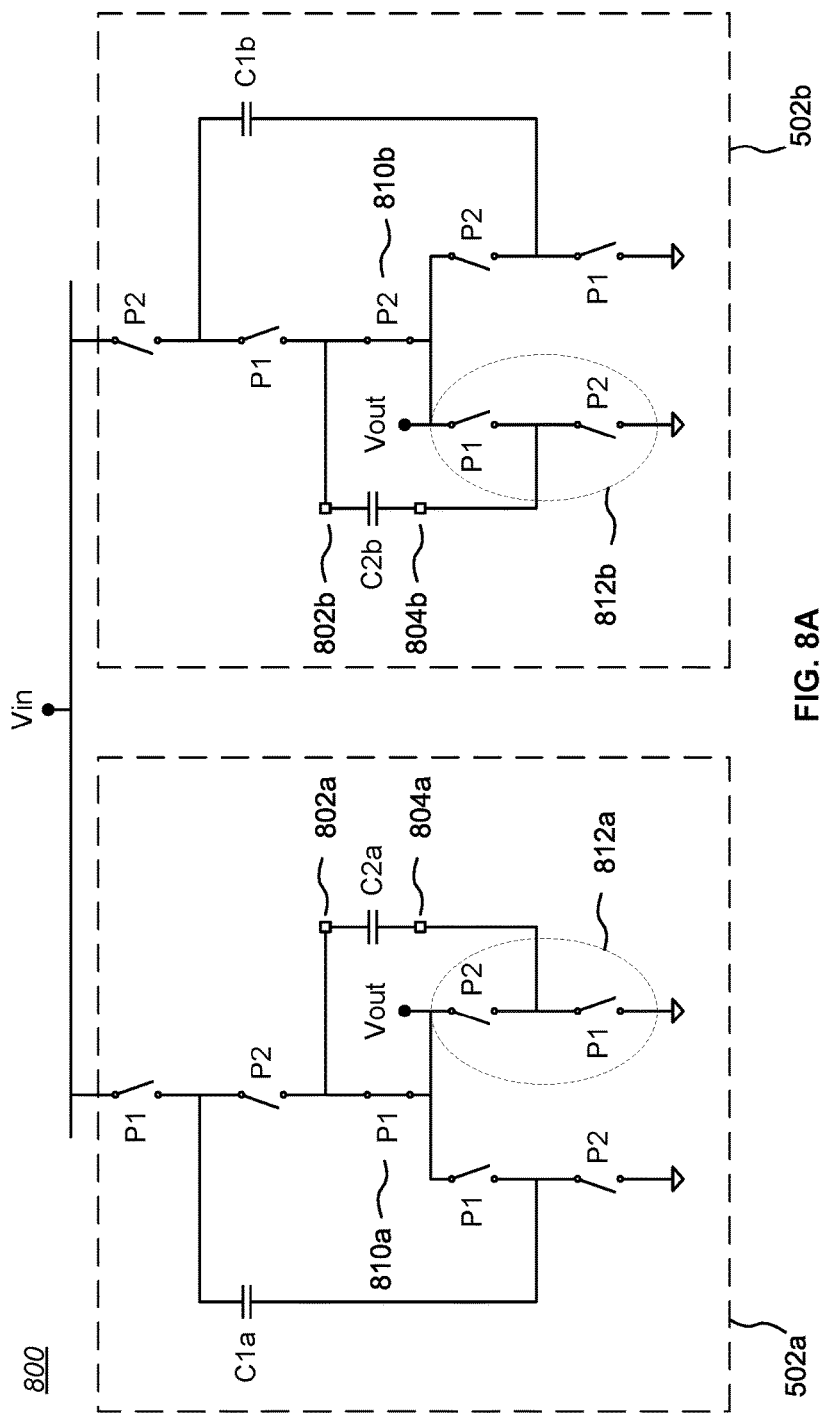
FIG. 8A is a schematic diagram of a third embodiment of a selectable conversion ratio DC-DC converter.
FIG. 8B shows one simple circuit which outputs an input clock phase Pn (i.e., either P1 or P2) or a logic "1" based on the state of a SELECT signal.
FIG. 8C shows one simple circuit which outputs an input clock phase Pn (i.e., either P1 or P2) or a logic "0" based on the state of a SELECT signal.

FIG. 8A is a schematic diagram of a third embodiment of a selectable conversion ratio DC-DC converter 800. In particular, the specific illustrated converter 800 may be selectably configured to have either a divide-by-2 or a divide-by-3 DC-to-DC buck conversion ratio using the same circuit. The same converter 800 may be used for DC-to-DC boost conversion by reversing the voltage input and voltage output.

In this example, in a DIV3 configuration, all capacitors (C1a, C2a, C1b, and C2b) are connected ("fitted", if external to an IC). In this specific example, at least capacitors C2a and C2b are respectively fitted to terminals 802a, 804a and 802b, 804b accessible externally to an IC containing the rest of the DC-DC converter circuitry, including its switches. All switches respond to the P1 and P2 clock signals in the same way as the converter 500 of FIG. 5 when in a DIV3 configuration (two of the switches 810a, 810b are shown closed, but that forced state is for the DIV2 configuration described below).

For a DIV2 configuration, capacitors C2a and C2b are not fitted to respective terminals 802a, 804a and 802b, 804b. Alternatively, capacitors C2a and C2b may be coupled to one of the respective terminals 802a, 804a and 802b, 804b, but not to both, thus creating an open circuit and effectively switching the fitted capacitors out of circuit. Further, in each cell 502a, 502b, switches 810a, 810b are forced to be closed (as shown), while one or both of the switches of the branches 812a, 812b respectively connected to terminals 804a, 804b are forced to be open (as shown). In contrast to the embodiments of FIG. 5 and FIG. 7, the clock signals to the switches directly connected to $V_{IN}$ are not controlled in order to select one of P1 or P2.

FIG. 8B shows one simple circuit which outputs an input clock phase Pn (i.e., either P1 or P2) or a logic "1" based on the state of a SELECT signal. FIG. 8C shows one simple circuit which outputs an input clock phase Pn (i.e., either P1 or P2) or a logic "0" based on the state of a SELECT signal.

For example, the clock signal to switch 810a may be provided through one instance of the circuit of FIG. 8B by applying P1 to the input of AND gate 820, while the clock signal to switch 810b may be provided through another instance of the circuit of FIG. 8B by applying P2 to the input of AND gate 820. When the SELECT signal is set to "1" (i.e., a code assigned to the DIV3 configuration), then the output of the corresponding NOR gate 822 will track the state of the input, P1 in one instance and P2 in the other instance. When the SELECT signal is set to "0" (i.e., a code assigned to the DIV2 configuration), then the inverter 824 will force the output of the NOR gate 822 of each such circuit instance to be a logic "1", thus forcing the corresponding switch 810a, 810b to a closed state.

Similarly, the clock signal to one or both of the switches of the branches 812a, 812b may be provided through respective instances of the circuit of FIG. 8C by applying the associated clock signal (P1 or P2) to the input of AND gate 830. When the SELECT signal is set to "1" (i.e., a code assigned to the DIV3 configuration), then the output of the AND gate 830 will track the state of the input, P1 or P2, as the case may be. When the SELECT signal is set to "0" (i.e., a code assigned to the DIV2 configuration), then the output of the AND gate 830 of each such circuit instance is forced to be a logic "0", thus forcing the corresponding switches of the branches 812a, 812b to an open state.

As with the embodiments described above, for a specific configuration, the SELECT signal may be statically set for a particular embodiment (e.g., permanently connected to a voltage or to circuit ground, not shown), or selectively set (e.g., with a mechanical or electronic switch, not shown), or dynamically set under program control (circuitry not shown).

While FIG. 8A shows an embodiment in which capacitors C2a and C2b may be omitted to create a DIV2 configuration, a DIV2 configuration can also be created by keeping capacitors C1a and C2b and instead omitting capacitors C1a and C1b instead, with suitable changes as to which switches are forced to be open or closed.

Fourth Embodiment

Figure 9A:
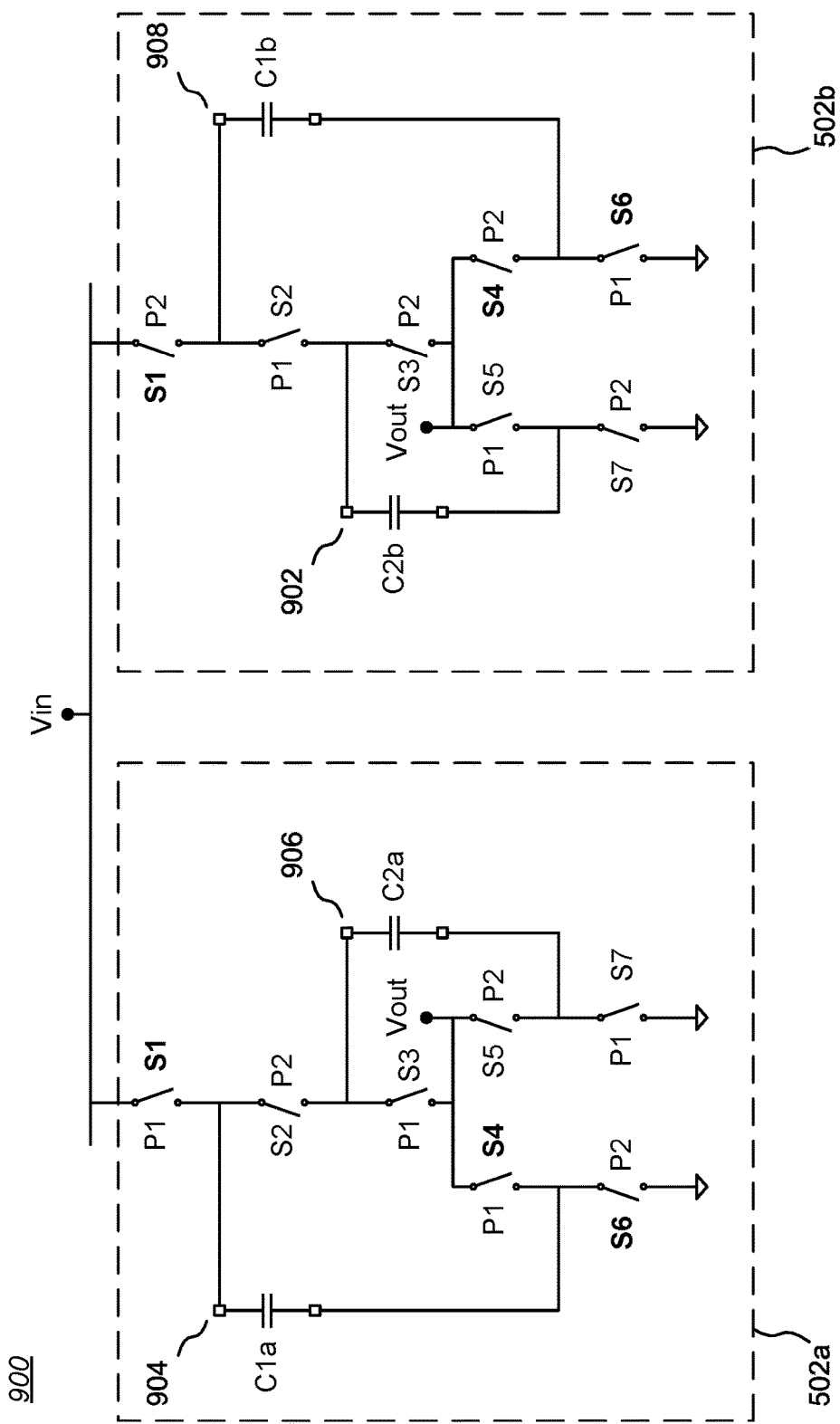
FIG. 9A is a schematic diagram of a fourth embodiment of a selectable conversion ratio DC-DC converter in a divide-by-3 Dickson converter configuration.
Figure 9B:
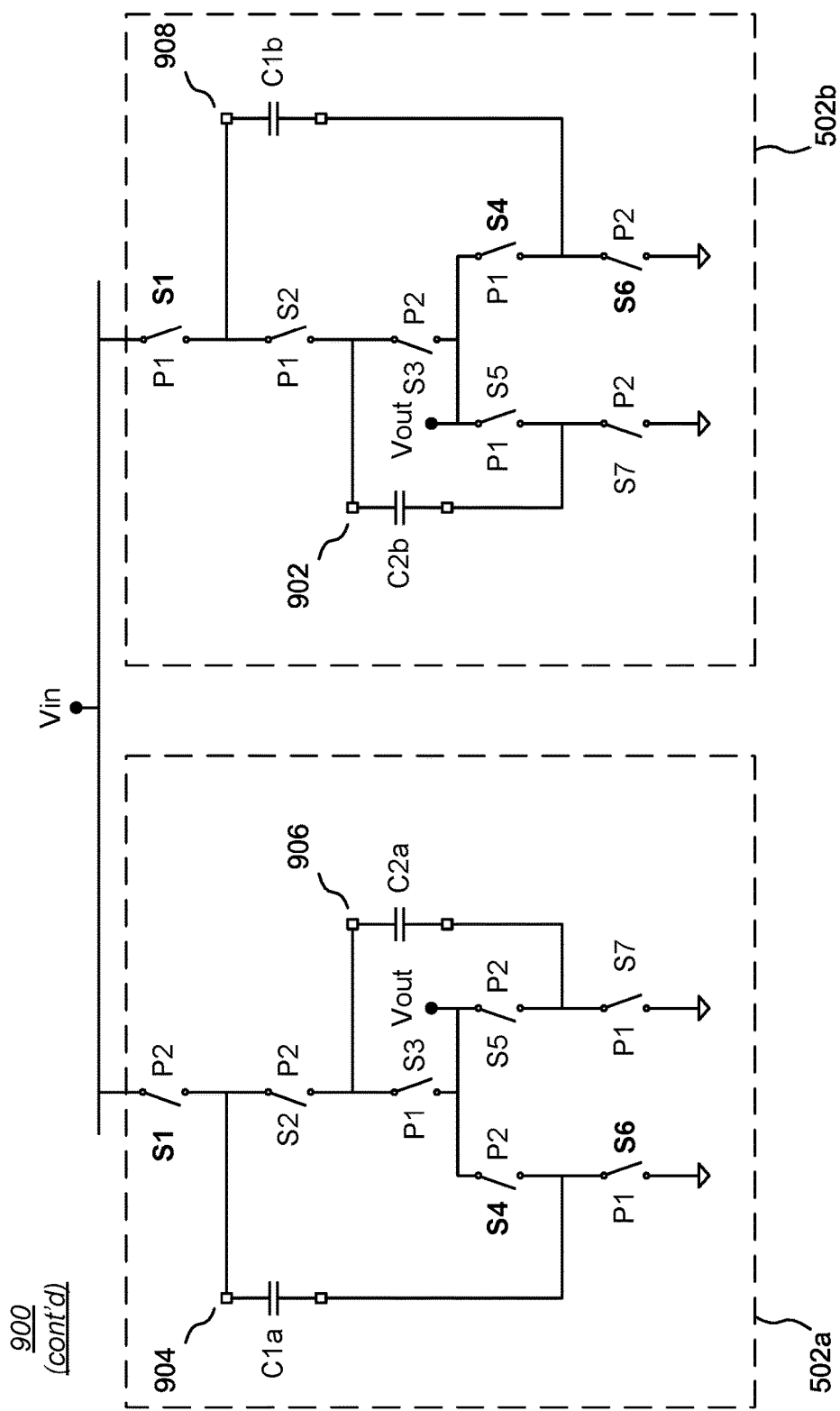
FIG. 9B is a schematic diagram of the fourth embodiment of the selectable conversion ratio DC-DC converter of FIG. 9A, but in a divide-by-2 Dickson converter configuration.

FIG. 9A is a schematic diagram of a fourth embodiment of a selectable conversion ratio DC-DC converter 900 in a divide-by-3 Dickson converter configuration. FIG. 9B is a schematic diagram of the fourth embodiment of the selectable conversion ratio DC-DC converter 900 of FIG. 9A, but in a divide-by-2 Dickson converter configuration. Of note, this fourth embodiment does not require changes to any off-chip (i.e., on board) components or connections, nor is it necessary to uses extra switches to connect or disconnect components. This is a key advantage of this fourth embodiment as compared to the embodiments above. In particular, the specific illustrated converter 900 may be selectably configured to have either a divide-by-2 or a divide-by-3 DC-to-DC buck conversion ratio using the same circuit and without any component changes at the board level. The same converter 900 may be used for DC-to-DC boost conversion by reversing the voltage input and voltage output. In the illustrated example, the layout of the switches P1, P2 is identical to FIG. 8A, except that all capacitors (C1a, C2a, C1b, C2b) are connected ("fitted", if external to an IC).

In the DIV3 configuration of FIG. 9A, all switches respond to the P1 and P2 clock signals in the same way as the converter 800 of FIG. 8A. Thus, focusing on the left cell 502a, switches S1, S3, S4, and S7 are controlled by the P1 clock signal, while switches S2, S5, and S6 are controlled by the P2 clock signal. The corresponding switches of the right cell 502b are exactly opposite in configuration and clock signal phasing, in essence being a mirror image of the left cell 502a. Accordingly, the converter 900 operates as a divide-by-3 Dickson converter circuit, with $V_{OUT}=V_{IN}/3$. Note that the output voltages, Vout, are configured to be coupled, for example, to an external output capacitor (not shown), as in FIG. 5 (e.g., Cout).

In a DIV2 configuration, the phases of the P1 and P2 clock signals applied to switches S1, S4, and S6 in both cells 502a, 502b are reversed. This has been indicated in the left cell 502a of FIG. 9B by using a "P1" switch symbol for the S6 switch, and by using a "P2" switch symbol for the for the S1 and S4 switches. Note that this is just a change in the polarity of the applied clock signals for certain switches, and not a change to the physical switches. The variable phase clock generation circuit 600 of FIG. 6 may be used, for example, for swapping the P1 and P2 clock signals.

Thus, focusing on the left cell 502a, the S1 and S4 switches responds to the P2 clock signal instead of the P1 clock signal, while the S6 switch responds to the P1 clock signal instead of the P2 clock signal. Consequently, in the DIV2 configuration for the left cell 502a, switches S3, S6, and S7 are controlled by the P1 clock signal, while switches S1, S2, S4, and S5 are controlled by the P2 clock signal. Again, the corresponding switches of the right cell 502b are exactly opposite in configuration and clock signal phasing, in essence being a mirror image of the left cell 502a. Accordingly, the converter 900 operates as a divide-by-2 Dickson converter circuit, with $V_{OUT}=V_{IN}/2$.

While FIGS. 9A and 9B describe the switch and phase arrangements necessary to switch between the DIV3 converter of FIG. 9A and the DIV2 converter of FIG. 9B without changes to any off-chip (i.e., on board) components or connections, or extra switches to connect or disconnect components, this embodiment requires somewhat more complexity in the clock signal generation and routing circuitry. The main issue stems from switch driver circuits needing to float with the switches that that they are driving—that is, the power supplies used for the drivers of switches S1 and S4 may need to be altered as well to ensure that a proper bias will be supplied to these floating supplies.

As is known in the art, typical driver circuits for FET switches have a $V_{SS}$ and $V_{DD}$ voltage inputs. For the DIV3 circuit of FIG. 9A, the driver for switch S1 would have its $V_{SS}$ input connected to the voltage at the top node 902 of capacitor C2b of cell 502b, while the driver for switch S4 would have its $V_{DD}$ input connected to the voltage at the top node 904 of capacitor C1a ("top" referring to the orientation of the schematic diagram 900 where Vin is at the top and the ground symbols are at the bottom). However, when changing the phases of switches S1, S4, and S6 to alter the DIV3 configuration of FIG. 9A to the DIV2 configuration of FIG. 9B, the $V_{SS}$ and $V_{DD}$ connections would be adjusted to ensure proper biasing. Specifically, when the phase for switch S4 changes from P1 to P2 for DIV2 operation, the $V_{DD}$ supply for the switch S4 driver will need to change from the top node 904 of capacitor C1a to the top node 906 of capacitor C2a (while, of course, still being able to drive switch S4 "ON" during the "ON portion" of phase P2). The same applies for switch S1, i.e., the $V_{SS}$ supply for the switch S1 drive will need to change from the top node 902 of capacitor C2b to the top node 908 of capacitor C1b (while, of course, still being able to drive switch S1 "ON" during the "ON portion" of phase P1).

Of course, the respective drivers for all other switches should also maintain proper levels of $V_{SS}$ and $V_{DD}$ to ensure their proper operation. This combination of requirements might require a selectable supply for various drivers (e.g., for switches S1 and S4). Other alternatives may exist, such as an array of phase and voltage generators that can be switched as needed to various switches.

Note that in the DIV2 configuration of FIG. 9B, switch S2 may be shorted to avoid the $R_{ON}$ losses associated that switch, thereby enhancing efficiency for DIV2 operation. More particularly, since switch S2 is switched in phase with re-phased switch S1, switch S2 is not needed for DIV2 operation. Shorting switch S2 may be accomplished by connecting external (with respect to the IC embodying the DIV3/DIV2 circuit) shorts to nodes 904 and 906, and to nodes 902 and 908 (i.e., the top nodes of capacitors C1*a* and C2*a*, and of capacitors C1*b* and C2*b*, respectively). Switch S2 will have an $R_{ON}$ typically in mohms; similarly, an external short may exhibit mohms of resistance. Thus, shorting across switch S2 results in two low resistance paths in parallel with each other, thereby minimizing the effective $R_{ON}$ for switch S2 and improving overall efficiency to the circuit in the DIV2 configuration. In such a configuration, switch S2 may still be switched with or without the external, parallel shorting path. As a person of skill will understand, an advantage of this fourth embodiment is a lack of external component connections or changes to convert between DIV2 and DIV 3. The aforementioned addition of an external short would improve efficiency, but require an external component.

With this fourth embodiment, there is no need for any off-chip physical changes to how off-chip capacitors are connected. Therefore, a DIV2 or DIV3 reconfiguration can be achieved entirely through software control without a priori knowledge of whether a fixed DIV2 or DIV3 configuration or a selectable DIV2/DIV3 configuration is required in any particular application. This fourth embodiment also has an option for external shorting connections to improve efficiency in the DIV2 configuration. This flexibility can be highly valuable for product developers, as a single board layout and bill of materials ("BOM") can be used for any application, and a late-stage design change can be easily accommodated. This simplification provides advantages in cost, complexity, size, and flexibility.

Boost Conversion Embodiments

As mentioned above, DC/DC converters can either decrease ("buck") an input voltage or increase ("boost") an input voltage. The converter embodiments described above are examples of buck converters, in which $V_{OUT}$ is less than $V_{IN}$. However, the converter embodiments are capable of being boost converters by applying a supply voltage to the $V_{OUT}$ node and taking the output voltage from the $V_{IN}$ node. For example, referring to the converter 500 of FIG. 5, if an input voltage were applied to the $V_{OUT}$ node, the output voltage at the $V_{IN}$ node would be either twice (i.e., a conversion ratio of 2:1) or three times (i.e., a conversion ratio of 3:1) the applied voltage, depending on whether the converter 500 is configured in a "MULTIPLY3" mode (e.g., capacitor C1*a* is coupled to the DIV3 conductor) or in a "MULTIPLY2" mode (e.g., capacitor C1*a* is coupled to the DIV2 conductor).

Integrated Circuit Embodiments

DC/DC converters often comprise an integrated circuit (IC) chip and external components and connections. For example, the switches in the above embodiments (and variations of such embodiments) that are controlled by the P1 and P2 clock signals would typically be fabricated on-chip as components of the IC. However, the capacitors C1*a*, C2*a*, C1*b*, C2*b*, and $C_{OUT}$ used in conjunction with any of the above-described novel DC/DC converter embodiments may be on-chip (i.e., as fabricated components of the IC) or—perhaps more commonly—off-chip. Placing the capacitors off-chip allow different capacitors of potentially higher quality and different capacitance values to be used with the same switch IC, thus increasing design flexibility and efficiency.

By splitting functionality—on-chip switches, off-chip capacitors—the configuration elements 504*a*, 504*b*, 704*a*, 704*b* are readily implemented as wired connections (e.g., jumpers or other conductors placed between a pair of externally accessible connection terminals of the IC) such that the converter 500, 700 may be set to a particular DC-to-DC conversion ratio at the time of system manufacture (e.g., when an IC embodying the switching portion of the converter 500, 700 is affixed to a printed circuit board or the like).

Thus, for example, focusing on cell 502*a* in FIG. 5, for a DIV3 configuration, a jumper is connected ("fitted") from one terminal of an external capacitor C1*a* to an external terminal for the DIV3 conductor, while no external connection is made ("DNF" or "do not fit") to an external terminal for the DIV2 conductor. Similarly, for a DIV2 configuration, a jumper is connected ("fitted") from one terminal of the external capacitor C1*a* to the external terminal for the DIV2 conductor, while no external connection is made ("DNF" or "do not fit") to the external terminal for the DIV3 conductor. As described above, in the DIV2 configuration, external capacitor C1*a* is thus connected in parallel with external capacitor C2*b*, effectively forming a single equivalent capacitor with greater total capacitance. Accordingly, with an external connection change for capacitors C1*a* and C2*a* and with the variable phase clock generation circuit 600 controlling Px and $\overline{Px}$ (i.e., either P1 or P2) to the switches 506*a*, 506*b*, respectively, then the same IC chip can be configured as either a DIV3 DC/DC Dickson buck converter or as a DIV2 DC/DC Dickson buck-converter. More generally, the same DC/DC converter IC chip can be configured as either a buck converter or as a boost converter, and with one of at least a first conversion ratio or a second conversion ratio.

Characteristics and Benefits of the Embodiments of the Invention

As the above-described embodiments indicate, a number of different circuits provide at least two different DC-to-DC conversion ratios. In some embodiments, in a first configuration, a selectable clock signal control circuit outputs a first clock signal phase to at least one switch of a switch array, a first capacitor is not connected in parallel with a second capacitor, and the switch array is operated, in response to respective application of the first clock signal phase and the second clock signal phase, to cyclically charge and discharge the first capacitor and the second capacitor so as to provide an output voltage at the output voltage terminal that has a first ratio with respect to the input voltage. In a second configuration, the selectable clock signal control circuit outputs the second clock signal phase to at least one switch of the switch array, the first capacitor is connected in parallel with the second capacitor and the switch array is operated, in response to respective application of the first clock signal phase and the second clock signal phase, to cyclically charge and discharge the first capacitor and the second capacitor in parallel (i.e., essentially as a single, larger capacitor) so as to provide an output voltage at the output voltage terminal that has a second ratio with respect to the input voltage, the second ratio being different from the first ratio.

In other embodiments, in a first configuration in which a first capacitor and a second capacitor have been coupled to a switch array and the first capacitor is not connected in parallel with the second capacitor, the switch array is operated, in response to respective application of a first clock signal phase and a second clock signal phase, to cyclically charge and discharge the first capacitor and the second capacitor so as to provide an output voltage at the output voltage terminal that has a first ratio with respect to the input voltage. In a second configuration, only one of the first capacitor and the second capacitor is coupled to the switch array, and the switch array is operated, in response to respective application of the first clock signal phase or the second clock signal phase or a first logic state or a second logic state, to cyclically charge and discharge the one capacitor (i.e., either the first capacitor or the second capacitor) coupled to the switch array so as to provide an output voltage at the output voltage terminal that has a second ratio with respect to the input voltage, the second ratio being different from the first ratio.

The selectable conversion ratio DC-DC converter 500 of the first embodiment is particularly efficient, with example circuits exhibiting less than half the losses of other embodiments encompassed by the invention (e.g., losses of about 2% compared to losses of about 4%).

The switches used in the various embodiments of the invention advantageously may be high voltage switching devices of the type described in U.S. patent application Ser. No. 15/832,626, filed Dec. 5, 2017, entitled "High Breakdown Voltage Switching Device", assigned to the assignee of the present invention and hereby incorporated by reference.

Benefits of the various embodiments of the invention include the following:

- A single IC can be used for product designs requiring at least two different DC-to-DC conversion ratios, and in particular both divide-by-2 and divide-by-3 DC-to-DC buck (down-conversion) ratios. Accordingly, a single-chip solution can be used for mobile platform products having Li-ion batteries of either two or three cells.
  - For example, for a printed circuit board (PCB) on which an IC in accordance with the present invention is mounted, a single external capacitor may be mounted per converter cell and the IC can be configured as a Dickson divide-by-2 buck converter.
  - If the same PCB has two mounted capacitors per converter cell, the same IC can be configured as a Dickson divide-by-2 buck converter or as a Dickson divide-by-3 buck converter. In the divide-by-2 configuration, both mounted capacitors are actively utilized to increase current capacity.
- Configuration changes can be made through use of simple capacitor connection options combined with logic control to change the phase or state of certain switches in an IC as a function of the capacitor configuration.
- Configuration changes can be made by fitting or not fitting off-chip capacitors, and/or by fitting or not fitting jumpers or conductive traces or the like (i.e., essentially zero ohm resistors) to terminals accessible externally to an IC containing the DC-to-DC converter switches.
- The single IC solution can be used for boost conversion as well as buck conversion.
- Embodiments of the present invention can be used with DC voltage sources of all types (not just batteries), and are particularly useful in conjunction with DC voltage sources having a wide variation in output voltages.
- The single-chip solutions encompassed by the present invention lower costs and enable easier part sourcing and management.

Methods

Figure 10:
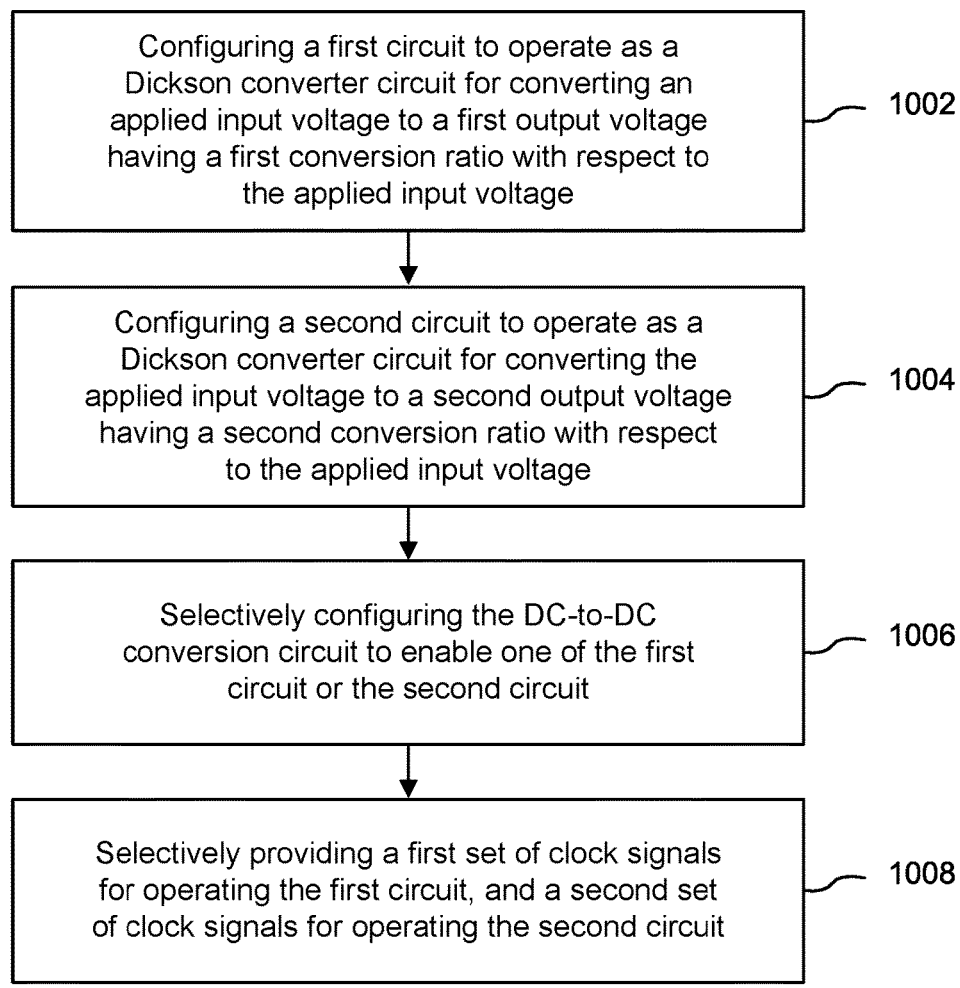
FIG. 10 is a process flow diagram that depicts a first method for DC-to-DC conversion.

Another aspect of the invention includes various methods for DC-to-DC conversion. For example, FIG. 10 is process flow diagram that depicts a first method for DC-to-DC conversion, including configuring a first circuit to operate as a Dickson converter circuit for converting an applied input voltage to a first output voltage having a first conversion ratio with respect to the applied input voltage (STEP 1002); configuring a second circuit to operate as a Dickson converter circuit for converting the applied input voltage to a second output voltage having a second conversion ratio with respect to the applied input voltage (STEP 1004); selectively configuring the DC-to-DC conversion circuit to enable one of the first circuit or the second circuit (STEP 1006); and selectively providing a first set of clock signals for operating the first circuit, and a second set of clock signals for operating the second circuit (STEP 1008). As an alternative to STEPS 1006 and 1008, the method may include selectively enabling the first circuit by providing a first set of clock signals, or selectively enabling the second circuit by providing a second set of clock signals.

Figure 11:
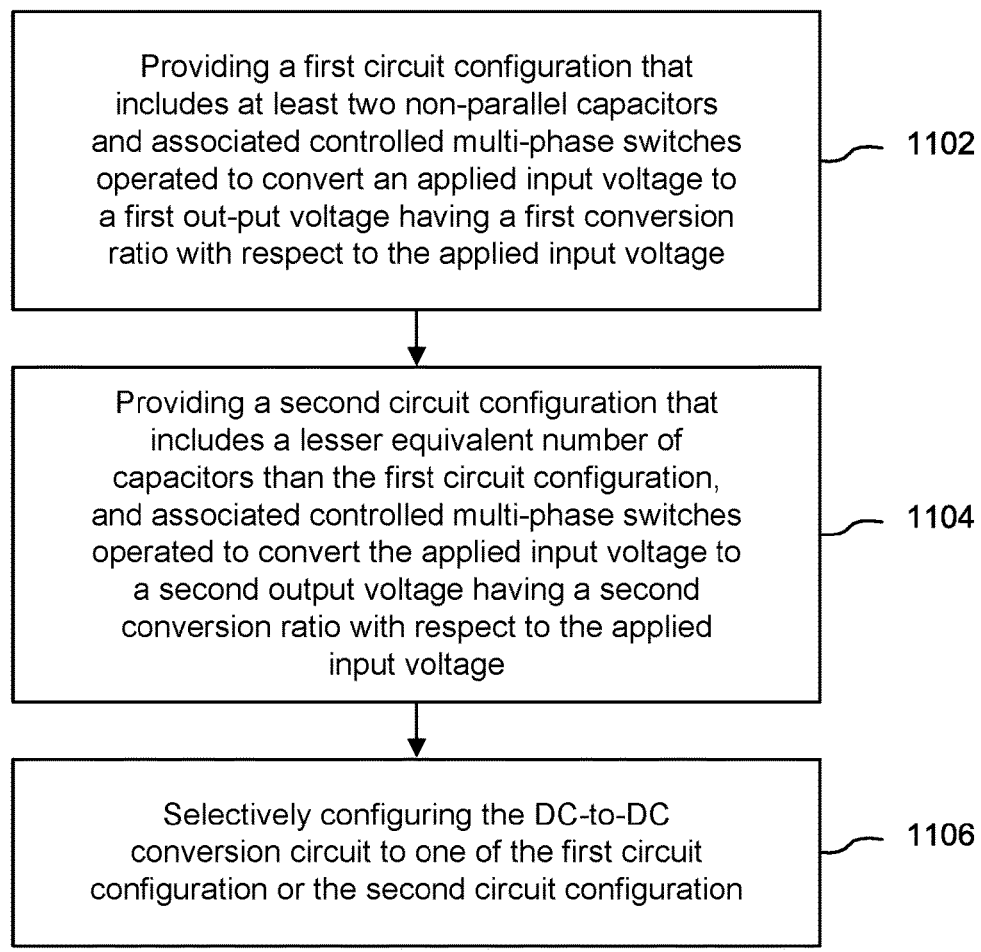
FIG. 11 is process flow diagram that depicts a second method for DC-to-DC conversion.

As another example, FIG. 11 is process flow diagram that depicts a second method for DC-to-DC conversion, including providing a first circuit configuration that includes at least two non-parallel capacitors and associated controlled multi-phase switches operated to convert an applied input voltage to a first output voltage having a first conversion ratio with respect to the applied input voltage (STEP 1102); providing a second circuit configuration that includes a lesser equivalent number of capacitors than the first circuit configuration, and associated controlled multi-phase switches operated to convert the applied input voltage to a second output voltage having a second conversion ratio with respect to the applied input voltage (STEP 1104); and selectively configuring the DC-to-DC conversion circuit to one of the first circuit configuration or the second circuit configuration (STEP 1106).

Another method for DC/DC conversion includes: providing an input voltage terminal configured to be coupled to a voltage source; providing an output voltage terminal; providing a selectable clock signal control circuit that selectively outputs either a first clock signal phase or a second clock signal phase; providing a switch array comprising a plurality of switches, coupled directly or indirectly to the input voltage terminal, each switch of the switch array controlled by one of the first clock signal phase or the second clock signal phase, and at least one switch of the switch array being coupled to the output of the selectable clock signal control circuit; providing a configuration element configured to selectively couple a first capacitor to one of at least two nodes of the switch array; and providing connections for coupling a second capacitor to the switch array; wherein, in a first configuration in which (1) the first capacitor and the second capacitor have been coupled to the switch array, (2) an input voltage from the voltage source has been coupled to the input voltage terminal, and (3) the selectable clock signal control circuit outputs the first clock signal phase to the at least one switch of the switch array, the first capacitor is not connected in parallel with the second capacitor and the switch array is operated, in response to respective application of the first clock signal phase and the second clock signal phase, to charge and discharge the first capacitor and the second capacitor so as to provide first output voltage at the output voltage terminal that has a first conversion ratio with respect to the input voltage; and wherein, in a second configuration in which (1) the first capacitor and the second capacitor have been coupled to the switch array, (2) an input voltage from the voltage source has been coupled to the input voltage terminal, and (3) the selectable clock signal control circuit outputs the second clock signal phase to the at least one switch of the switch array, the first capacitor is connected in parallel with the second capacitor and the switch array is operated, in response to respective application of the first clock signal phase and the second clock signal phase, to charge and discharge the first capacitor and the second capacitor so as to provide a second output voltage at the output voltage terminal that has a second conversion ratio with respect to the input voltage, the second conversion ratio being different from the first conversion ratio.

Yet another method for DC/DC conversion includes: providing an input voltage terminal configured to be coupled to a voltage source; providing an output voltage terminal; providing at least one first clock signal control circuit that selectively outputs either an applied clock signal phase or a first logic state; providing at least one second clock signal control circuit that selectively outputs either an applied clock signal phase or a second logic state; providing a switch array comprising a plurality of switches, coupled directly or indirectly to the input voltage terminal, each switch of the switch array controlled by one of a first clock signal phase or a second clock signal phase, and at least one switch of the switch array being coupled to the output of the first clock signal control circuit, and at least one switch of the switch array being coupled to the output of the second clock signal control circuit; providing connections for optionally coupling a first capacitor to the switch array; and providing connections for optionally coupling a second capacitor to the switch array; wherein, in a first configuration in which (1) the first capacitor and the second capacitor have been coupled to the switch array, (2) an input voltage from the voltage source has been coupled to the input voltage terminal, and (3) each first clock signal control circuit and each second clock signal control circuit outputs the respective applied clock signal phase, the first capacitor is not connected in parallel with the second capacitor and the switch array is operated, in response to respective application of the first clock signal phase and the second clock signal phase, to charge and discharge the first capacitor and the second capacitor so as to provide a first output voltage at the output voltage terminal that has a first conversion ratio with respect to the input voltage; and wherein, in a second configuration in which (1) only one of the first capacitor and the second capacitor have been coupled to the switch array, (2) an input voltage from the voltage source has been coupled to the input voltage terminal, and (3) each first clock signal control circuit outputs the first logic state, and each second clock signal control circuit outputs the second logic state, the switch array is operated, in response to respective application of the first clock signal phase or the second clock signal phase or the first logic state or the second logic state, to charge and discharge the one of the first capacitor or the second capacitor coupled to the switch array so as to provide a second output voltage at the output voltage terminal that has a second conversion ratio with respect to the input voltage, the second conversion ratio being different from the first conversion ratio.

Other aspects of the above methods include: the first and second output voltages being less than the input voltage; the first and second output voltages being greater than the input voltage; the first conversion ratio and the second conversion ratio being integer-based ratios; the first conversion ratio being 3:1 and the second conversion ratio being 2:1; the clock signals being generated by a two-phase clock and being non-overlapping; fabricating the method elements as an integrated circuit; fabricating at least one of the capacitors as a component of an integrated circuit; configuring an output voltage terminal to be coupled to an external output capacitor; configuring includes either a "fitted" or "do-not-fit" connection.

Fabrication Technologies & Options

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, the invention may be implemented in other transistor technologies such as BCD (bipolar-CMOS-DMOS), bipolar, GaAs HBT, GaN HEMT, GaAs pHEMT, and MESFET technologies. Monolithic IC implementation is particularly useful since parasitic capacitances generally can be kept low (or at a minimum, kept uniform across all units, permitting them to be compensated) by careful design.

Voltage levels may be adjusted, or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A DC-to-DC conversion circuit, including:
    (a) a configurable clock signal control circuit that selectively outputs a first phase clock signal, a second phase clock signal, and a selectable phase clock signal;
    (b) a first circuit configuration coupled to the configurable clock signal control circuit and operable as a Dickson converter circuit for converting an applied input voltage to a first output voltage having a first conversion ratio with respect to the applied input voltage, the first circuit configuration having at least one switch responsive to the first clock signal phase, at least one switch responsive to the second clock signal phase, and at least one switch responsive to the selectable phase clock signal; and
    (c) a second circuit configuration coupled to the configurable clock signal control circuit and operable as a Dickson converter circuit for converting the applied input voltage to a second output voltage having a second conversion ratio with respect to the applied input voltage, the second circuit configuration having at least one switch responsive to the first clock signal phase, at least one switch responsive to the second clock signal phase, and at least one switch responsive to the selectable phase clock signal.

2. A DC-to-DC conversion circuit, including:
    (a) a configurable clock signal control circuit that selectively outputs a first phase clock signal, a second phase clock signal, and a selectable phase clock signal;
    (b) a first circuit configuration coupled to the configurable clock signal control circuit and operable as a Dickson converter circuit for converting an applied input voltage to a first output voltage having a first conversion ratio with respect to the applied input voltage, the first circuit configuration having at least one switch responsive to the first clock signal phase, at least one switch responsive to the second clock signal phase, and at least one switch responsive to the selectable phase clock signal;
    (c) a second circuit configuration coupled to the configurable clock signal control circuit and operable as a Dickson converter circuit for converting the applied input voltage to a second output voltage having a second conversion ratio with respect to the applied input voltage, the second circuit configuration having at least one switch responsive to the first clock signal phase, at least one switch responsive to the second clock signal phase, and at least one switch responsive to the selectable phase clock signal; and
    (d) a configuration element for selectively configuring the DC-to-DC conversion circuit to one of the first circuit configuration or the second circuit configuration.

3. A DC-to-DC conversion circuit, including:
    (a) a first circuit configuration that includes at least two non-parallel capacitors and associated controlled multi-phase switches operated to convert an applied input voltage to a first output voltage having a first conversion ratio with respect to the applied input voltage;
    (b) a second circuit configuration that includes a lesser equivalent number of capacitors than the first circuit configuration, and associated controlled multi-phase switches operated to convert the applied input voltage to a second output voltage having a second conversion ratio with respect to the applied input voltage; and
    (c) a configuration element for selectively configuring the DC-to-DC conversion circuit to one of the first circuit configuration or the second circuit configuration.

4. The invention of claim 1, 2, or 3, wherein the first and second output voltages are less than the input voltage.

5. The invention of claim 1, 2, or 3, wherein the first and second output voltages are greater than the input voltage.

6. The invention of claim 1, 2, or 3, wherein the first conversion ratio and the second conversion ratio are integer-based ratios.

7. The invention of claim 1, 2, or 3, wherein the first conversion ratio is 3:1 and the second conversion ratio is 2:1.

8. The invention of claim 1, 2, or 3, wherein the output voltages are configured to be coupled to an external output capacitor.

9. The invention of claim 1, 2, or 3, wherein the DC-to-DC conversion circuit is fabricated as an integrated circuit.

* * * * *